(12) United States Patent
Tseng

(10) Patent No.: US 6,227,083 B1
(45) Date of Patent: May 8, 2001

(54) CHAMFER FORMING HEAD FOR PAPER ROLL

(76) Inventor: Fa-Hsi Tseng, 5F-23, 70, Fu-Shinh Road, Taoyuan (TW)

( * ) Notice: Subject to any disclaimer, the term of this patent is extended or adjusted under 35 U.S.C. 154(b) by 0 days.

(21) Appl. No.: 09/364,301

(22) Filed: Jul. 30, 1999

(51) Int. Cl.$^7$ ....................................................... B23B 5/00
(52) U.S. Cl. ................................ 82/113; 82/161; 407/36
(58) Field of Search ........................ 82/113, 161; 407/36, 407/37, 25, 29, 30, 33, 34, 44, 45, 47, 51

(56) References Cited

U.S. PATENT DOCUMENTS

| | | | |
|---|---|---|---|
| 2,218,147 | 10/1940 | Greenwood | 82/128 |
| 3,595,107 | * 7/1971 | Dackow | 82/113 |
| 3,603,182 | * 9/1971 | Jackman | 82/113 |
| 3,636,803 | * 1/1972 | Miller | 82/113 |
| 3,999,452 | 12/1976 | Larsen | 82/113 |
| 5,351,587 | 10/1994 | Griffin | 82/113 |

* cited by examiner

Primary Examiner—Henry Tsai
(74) Attorney, Agent, or Firm—Dougherty & Troxell

(57) ABSTRACT

A chamfer forming head for paper roll comprising an inner threading hole to receive a rotating head thereof is provided. The front portion of said forming head is provided with an annual recessed surface having the same diameter of a paper roll to be machined. The forming head further comprises a plurality of radial holes disposed equiangularly around the peripheral of the forming head. The radial holes are communicated with the annular recessed surface. Each of the radial holes is received and disposed with a pressing tool which comprises an end portion, a cutout, a pressing surface, an aligning cutting slot and a contacting end. The pressing tool can be readily adjusted within the radial hole such that the contacting end of the pressing face can be raised to a level which is higher than the annular recessed surface. A locking element is provided and disposed within said radial hole such that the pressing tool can be locked up when the pressing tool is adjusted. Wherein the edge of the paper roll can be readily machined by the pressing face of the pressing tool such that a chamfer can be readily attained on the paper roll.

3 Claims, 4 Drawing Sheets

CHAMFER FORMING HEAD FOR PAPER ROLL

FIELD OF THE INVENTION

The present invention relates to a forming head, more particularly, to a chamfer forming head for paper roll used for winding threads thereon. The forming head is formed by cutting without scraps or burrs. On the other hand, ventilating holes are provided such that the paper roll is prevented from burning.

DESCRIPTION OF PRIOR ART

To the paper roll used for winding threads thereon, a chamfering process will be performed at one end to remove the hooks which may damage the threads wound thereon. Normally, a chamfering tool is applied to remove the sharp edge with suitable machine, such as a lathe. However, this cutting process having scraps is not suitable for paper roll since it has a low density. Besides, the paper roll contains many a fibrous material. Even the sharp edge at one end is chamfered, burrs and projected fibers will still hook the thread and damage the threads.

U.S. Pat. No. 5,351,587 teaches the use of a pair of teeth 43 to process one end of a nipple 30. U.S. Pat. No. 3,999,452 teaches the use of two pairs of cutters 31 and 32 to process one end of a tube. U.S. Pat. No. 2,218,147 teaches the use of cutting tools 8 to process one end of a pipe 13. Because these teachings achieve chamfering by direct cutting, they are not suitable for processing paper roll.

Another existing working process is exerting pressure onto the area of the paper roll such that a chamfer can be attained. However, even this performing process can readily forming a chamfer without scraps or burrs, another negative effect is attained since the pressure exerted at a certain point will generate a deformation on the paper roll. As the pressure exerted onto the paper roll increases from a single point to a circle, the frictional forces increases accordingly such that the rotation of the paper roll will be negatively influenced. In a worse condition, the chamfering area will be burned by the heat resulted from frictional force.

SUMMARY OF THE INVENTION

It is the objective of this invention to provide a chamfer forming head wherein the problems encountered by the existing techniques can be ultimately solved.

It is still the objective of this invention wherein the chamfering process is performed without scraps, low frictional force and the pressure exerted is uniformly distributed.

BRIEF DESCRIPTION OF DRAWINGS

In order that the present invention may more readily be understood the following description is given, merely by way of example with reference to the accompanying drawings, in which.

Brief Description of Numerals

Figure 1:
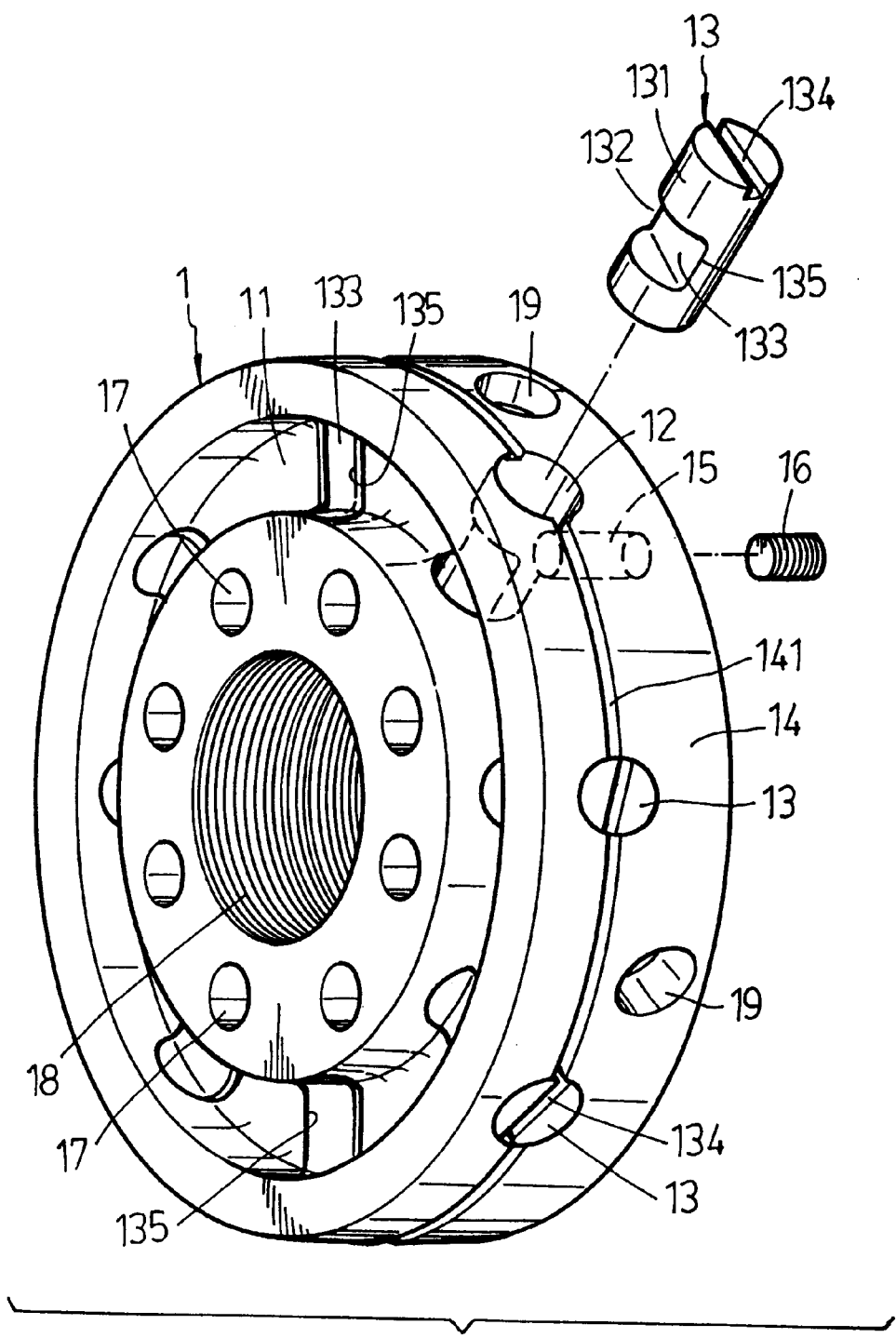
FIG. 1 is a partially exploded perspective view of the forming head made according to the present invention.

| | | | |
|---|---|---|---|
| 1 | forming head | 11 | annular recessed surface |
| 12 | radial hole | 13 | pressing tool |
| 131 | end portion | 132 | cutout |
| 133 | pressing face | 134 | aligning cutting slot |
| 135 | contacting end | 14 | periphery |
| 141 | primary aligning slot | 15 | threaded hole |
| 16 | locking element | 17 | ventilating hole |
| 18 | inner threaded hole | 19 | actuating hole |
| 2 | rotating head | 21 | outer thread portion |
| 3 | paper roll | | |
| 31 | edge | | |

DETAILED DESCRIPTION OF PREFERRED EMBODIMENT

Referring to FIGS. 1 to 4, the forming head 1 generally comprises an inner threaded hole 18 and an annular recessed surface 11 having same dimension to the outer diameter of the paper roll 3 disposed at the front portion. When the inner threaded hole 18 is engaged with the outer threaded portion 21 of the rotating head 2, a suitable tool can be inserted into the actuating hole 19 to rotate the rotating head 2 such that it can be firmly attached to the forming head 1. When the forming head 1 is rotated by the rotating head 2, the direction of rotation is same to the direction of rotation of the outer threaded portion 21 into the inner threaded hole 18. Accordingly, the forming head 1 will not escape therefrom during processing.

When the edge 31 of the paper roll 3 is pressed by the annular recessed surface 11 of the forming head 1, a chamfer can be formed at the edge 31 of the paper roll 3. However, the contacting area is comparatively large which in turn increases the frictional force which will damage the paper roll 3. In light of this, the annular recessed surface 11 defines the working area such that the paper roll 3 can be prevented from damage during working process.

Figure 3:
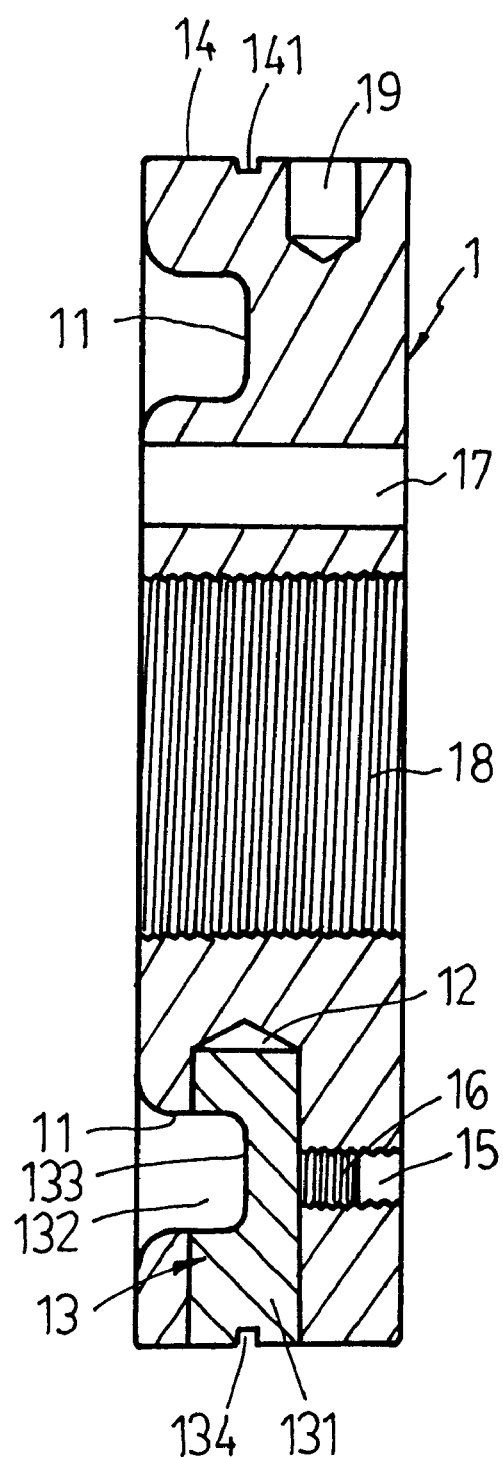
FIG. 3 is a cross sectional view taken from line 3—3 of FIG. 2.
Figure 4:
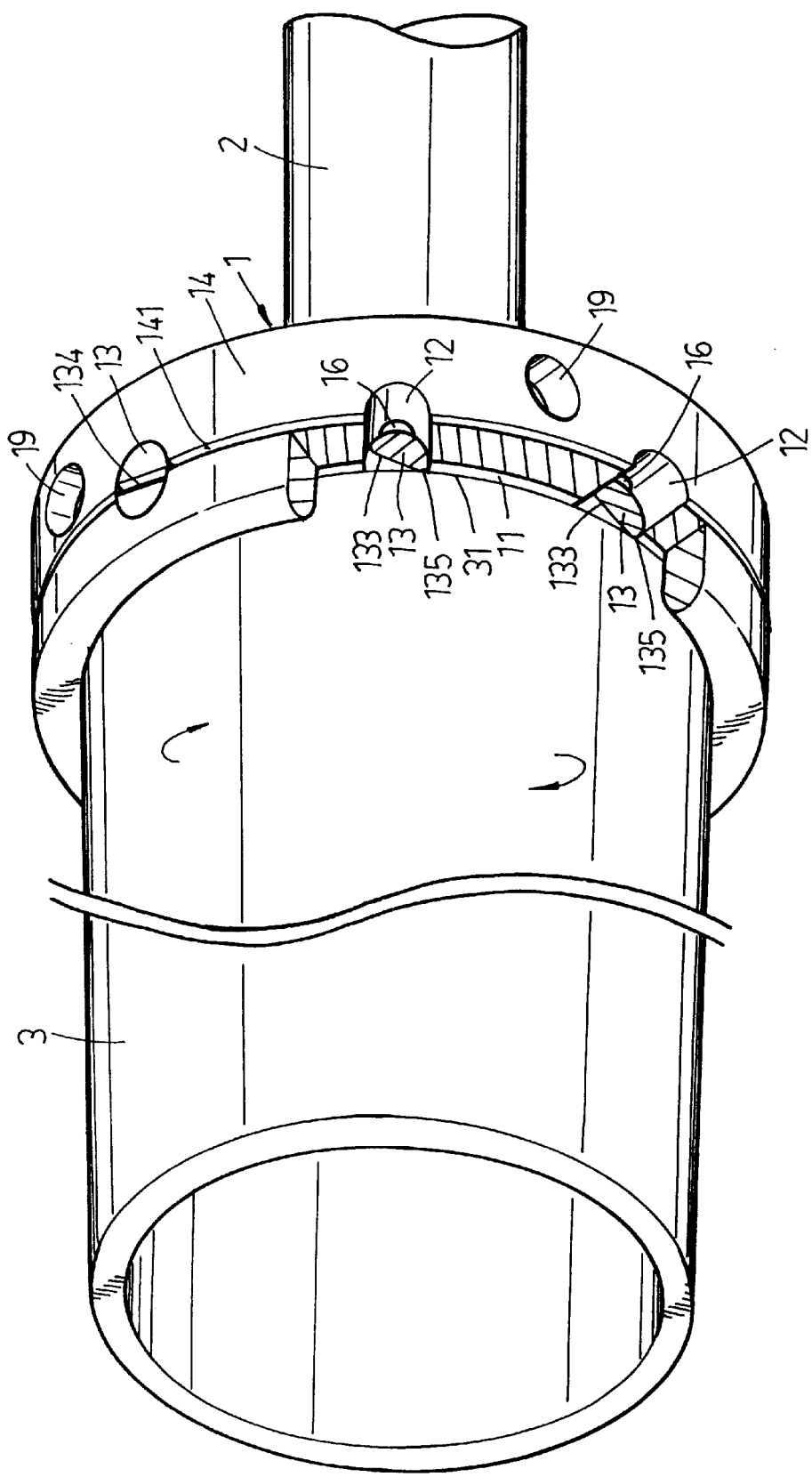
FIG. 4 is a perspective view of the forming head, rotating head and paper roll shown partially thereof.

The formation of chamfer on the paper roll 3 is attained by the pressing tool 13 in the present invention. As shown in FIGS. 1, 3 and 4, the forming head 1 is provided with a plurality of radial holes 12 disposed equiangularly pass through the annular recessed surface 11. The forming head 1 has a periphery 14 through which radial holes 12 pass. In the preferred embodiment shown, eight (8) radial holes 12 are provided. The forming head 1 is also provided with a plurality of threaded holes 15 corresponding to each of the radial holes 12 at its back portion. Each of the radial holes 12 is intersecting with the annular recessed surface 11 and a pressing tool 13 is disposed therein. The threaded hole 15 is further provided with a locking element 16 such that the pressing tool 13 can be locked up or released.

The pressing tool 13 is provided with an end portion 131, a cutout 132, a pressing face 133, on aligning cutting slot 134 and a contacting end 135. The pressing tool 13 is made of tungsten carbide for the advantage of high durability. The cutout 132 is meshed with the space within the annular recessed surface 11 when the pressing tool 13 is disposed within the radial hole 12. Accordingly, the pressing face 133 may execute preset functions. When the locking element 16 is released, the pressing tool 13 can be moved forward and into the radial hole 12. In order to avoid a scrap-cutting to the paper roll 3 by the pressing face 133, the contacting end 135 of the pressing face 133 is slightly lifted and higher than the bottom of the recessed surface 11. The contacting end 135 is defined when the forming head 1 is rotated, the end of the pressing face 133 which is in contact with the edge 31 of the paper roll 3. By this arrangement, when the forming head 1 is rotated, the raised rear end of the pressing face 133 is pressed against the edge 31 of the paper roll 3, as clearly shown in FIG. 4. Accordingly, a chamfer is formed thereof as the pressing face 133 exerts a pressing force to the paper roll 3. Furthermore, in order to prevent the scraping resulted by the pressing face 133, the pressing face 133 has a convex surface and a sharp cutting end.

By the forgoing description, the annular recessed surface 11 may readily form a chamfer on the edge 31 of the paper roll 3 within a defined working scope without the defects of deforming and with excellent working quality. The equiangularly distributed pressing tools 13 provides an uniform pressing force, a lower frictional force and no scraps or burrs after working. Accordingly, a round, smooth chamfer can be readily attained by the provision of the present invention. Besides, the burned chamfer is no longer occurred.

Figure 2:
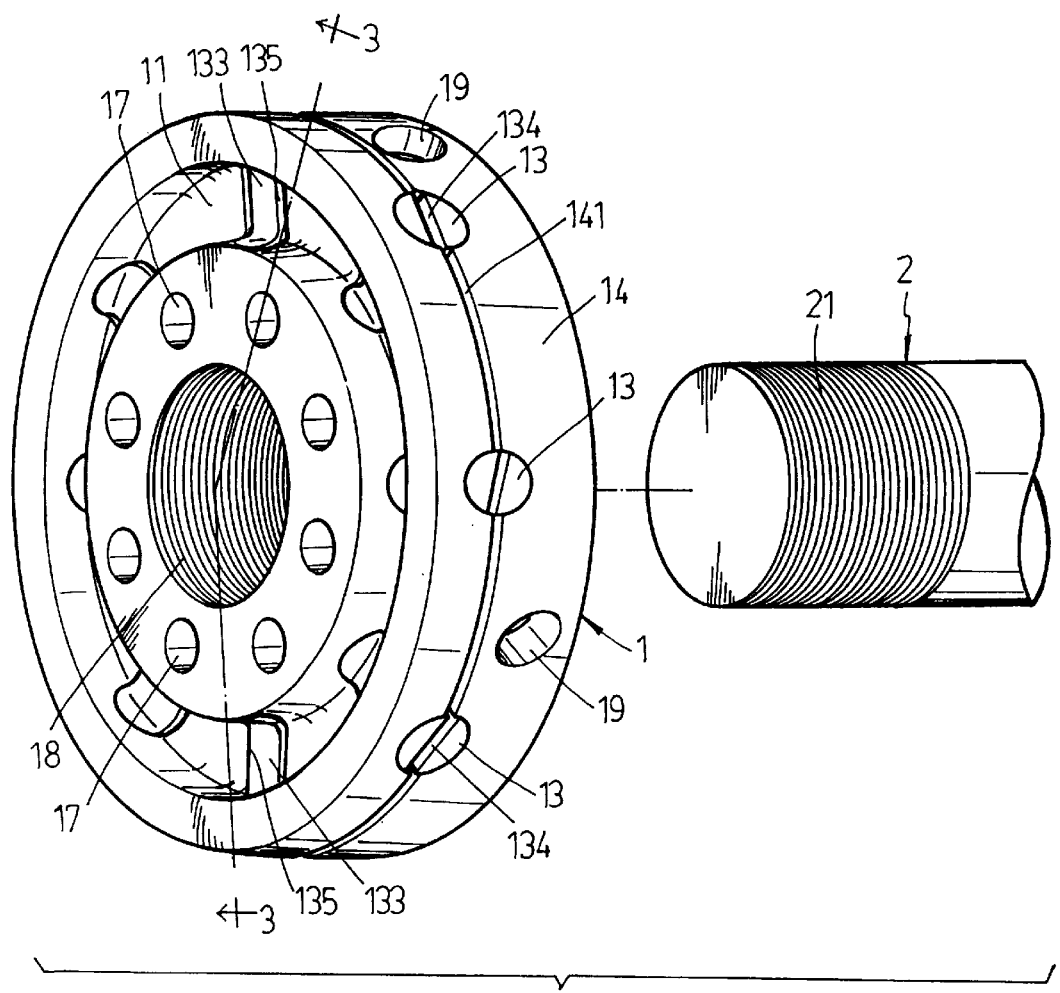
FIG. 2 is a perspective view of the forming head and a rotating head made according to the present invention.

Referring to FIGS. 2 and 3, in order to attain a better ventilating effect for the forming head 1 during the working process, a plurality of ventilating holes 17 are provided between the inner threaded hole 18 and the annular recessed surface 11.

Referring to FIGS. 1, 3 and 4, as describe above, the pressing tool 13 can be moved forward into the radial hole 12. In order to attain a better result, an adjusting reference is provided. In this embodiment, the pressing tool 13 is provided with an aligning cutting slot 134 at the outer surface of the end portion 131 and the cutting slot 134 is flushed to the pressing face 133. In the peripheral of the forming head 1, a primary aligning slot 141 is provided in the position of the periphery 14 and which is also passing through the center of the radial holes 12. Accordingly, the angular difference between the aligning cutting slot 134 and the primary aligning slot 141 can be used as a reference for raising the level of the contacting end 135 of the pressing face 133. In light of this, an accurate adjustment can be attained. Furthermore, the aligning cutting slot 134 can be readily rotated by a screw driver. When the pressing tool 13 is adjusted, the locking element 16 can be locked up such that the pressing tool 13 is locked up accordingly.

What is claimed is:

1. A chamfer forming device for a paper roll having a diameter comprising:

a forming head having an inner threaded mounting hole configured to receive a rotating head and an annular recessed surface having a diameter the same as that of the paper roll to be machined;

a plurality of radial holes disposed equiangularly and passing through a periphery of the forming head and the annular recessed surface;

a plurality of threaded holes respectively communicating with said radial holes;

a pressing tool respectively mounted within each of said radial holes, said pressing tool each comprised of an end portion, a cutout, a pressing surface, and a contacting end, said pressing tool being adjustable within the associated radial hole such that the contacting end is at a higher level than the annular recessed surface; and, a locking element disposed within each threaded hole such that said pressing tools are locked when adjusted;

wherein the paper roll is machined by said pressing facses of said pressing tools to form a chamfer on said paper roll.

2. The chamfer forming bead for a paper roll as recited in claim 1, wherein said forming head further comprises a plurality of ventilating holes located between said inner threaded mounting hole and said annular recessed surface.

3. The chamfer forming head for a paper roll as recited in claim 1, wherein each of said pressing tools further comprises an aligning cutting slot in the end portion and wherein the forming head is provided with a primary aligning slot on the periphery, said primary aligning slot passing through centers of said plurality of radial holes, wherein the angular difference between said aligning cutting slot and said primary aligning slot serves as a reference for the raised level of said contacting end of said pressing face of said pressing tool.

* * * * *